United States Patent [19]

Sander et al.

[11] Patent Number: 4,840,736
[45] Date of Patent: Jun. 20, 1989

[54] PROCESS FOR PRODUCING COMBUSTIBLE SEWAGE SLUDGE FILTER CAKES IN FILTER PRESSES

[75] Inventors: Bruno Sander, Ludwigshafen; Herbert Lauer, Mutterstadt; Manfred Neuwirth, Mannheim, all of Fed. Rep. of Germany

[73] Assignee: BASF Aktiengesellschaft, Ludwigshafen, Fed. Rep. of Germany

[21] Appl. No.: 534,681

[22] Filed: Sep. 22, 1983

Related U.S. Application Data

[63] Continuation of Ser. No. 320,681, Nov. 12, 1981, abandoned.

[30] Foreign Application Priority Data

Nov. 29, 1980 [DE] Fed. Rep. of Germany ....... 3045120

[51] Int. Cl.$^4$ ........................... C02F 11/14; C02F 1/52
[52] U.S. Cl. .................................... 210/727; 210/729; 210/738; 210/770; 210/804; 210/806
[58] Field of Search ............... 210/723, 726, 727, 729, 210/738, 804, 806, 770

[56] References Cited

U.S. PATENT DOCUMENTS

| | | | |
|---|---|---|---|
| 2,190,596 | 2/1940 | Dorr | 210/738 |
| 3,226,319 | 12/1965 | Schick | 210/727 X |
| 3,660,284 | 5/1972 | Camp | 210/804 X |
| 3,842,005 | 10/1974 | Moser et al. | 210/727 |
| 3,959,133 | 5/1976 | Fulton | 210/804 X |
| 3,969,483 | 7/1976 | Stinson et al. | 210/729 |
| 4,168,236 | 9/1979 | Bahr | 210/294 |
| 4,411,797 | 10/1983 | Sander et al. | 210/727 |

FOREIGN PATENT DOCUMENTS

| | | | |
|---|---|---|---|
| 241373 | 7/1965 | Austria | 210/727 |
| 247804 | 6/1966 | Austria | 210/726 |
| 349399 | 4/1979 | Austria | 210/294 |
| 2920350 | 11/1980 | Fed. Rep. of Germany . | |
| 1049803 | 11/1966 | United Kingdom | 210/726 |

*Primary Examiner*—Richard V. Fisher
*Attorney, Agent, or Firm*—Keil & Weinkauf

[57] ABSTRACT

A process for dewatering sewage sludges of which the sludge solids contain less than 70% of organic matter, and whose dewatering characteristics have been improved by adding organic flocculants, on a filter press, wherein the sewage sludges are concentrated by adding an organic flocculant during thickening by gravity sedimentation from 0.5–5.0% by weight of sludge solids to 6–14, and especially 8–12, % by weight of sludge solids, the sewage sludges are mixed with additives, such as finely divided coal or ash or mixtures thereof, in an amount of from 0.5 to 1.5 parts by weight per part by weight of sludge solids, and the sludges are treated, before, during or after admixture of the additives, with a further 2–8 kg or organic flocculant/tonne of sludge solids and are then dewatered on the filter press.

6 Claims, No Drawings

PROCESS FOR PRODUCING COMBUSTIBLE SEWAGE SLUDGE FILTER CAKES IN FILTER PRESSES

This is a continuation of application Ser. No. 320,681, filed Nov. 12, 1981, now abandoned.

The present invention relates to a process for dewatering, on a filter press, sewage sludges of which the sludge solids contain less than 70% of organic matter, and whose dewatering characteristics have been improved by addition of an organic flocculant.

In sewage plants of industrial companies, and in central large-scale municipal sewage plants, into which substantial amounts of industrial effluent are led, it is becoming increasingly necessary to dispose of the resulting sewage sludge by combustion. Sewage sludges of such origin can contain constituents which prevent the sludge from being dumped. A reliable way of disposing of the sludge so as not to pollute the environment is to ash it completely. Combustion of the sewage sludges is also desirable because of the great increase in transport costs and because of shortage of space on most dumps.

Economical combustion is only feasible if the sludge solids are beforehand concentrated to a very high degree. The specific water content (kg of water/kg of sludge solids) of the sludges to be combusted should be very low.

In conventional processes, the sludges are dewatered on decanters or perforated-belt presses, using organic flocculants. In such cases a subsequent energy-consuming drying process must be used so as to concentrate the dewatered sewage sludges further and allow them to be combusted economically.

Even in the most widely used dewatering process, namely one-step dewatering on a chamber filter press, using iron salts and lime as dewatering assistants, and employing inert additives, for example ash, sand or rock powder, the filter cakes produced are not per se suitable for combustion. Substantial amounts of additional fuels, such as coal and/or oil, must be introduced into them. Furthermore, the coatings and crusts caused by the lime interfere with the combustion equipment.

Using a different dewatering process U.S. Pat. No. 4,411,797 more thorough mechanical dewatering of sewage sludges on chamber filter presses, using organic flocculants, is attainable. The sewage sludges are pretreated with organic flocculants under defined conditions, freed from the greater part of the sludge liquor by gravity filtration and then subjected to pressure filtration in a chamber filter press. The prior concentration of the sludge solids to 10-20% results in the sludge floc having sufficient mechanical stability for the process. The sewage sludge can, without suffering damage, be conveyed, pumped and filtered in presses under pressures of up to 15 bar. For sewage sludges of which the solids contain less than 65% of organic matter, the sludge solids contents achieved are so high that the calorific value of the filter cake is of an order which permits self-sustaining combustion. In the case of sewage sludges having a higher content of organic matter in the solids, it is necessary to add a small amount of coal sludge in order to obtain a filter cake which permits self-sustaining combustion. In this process it is sometimes necessary to reduce the thickness of the layers handled in the filter chambers, so as to achieve particularly high sludge solids contents.

It is an object of the present invention to provide a dewatering process which does not suffer from the above disadvantages and in which the requisite concentration of the sludge solids to above 10% is achievable by simpler and more expedient measures. Accordingly, it is also an object of the invention to produce stable sludge floc so that the pressure filtration can be effected directly on a filter press and the prior gravitational filtration can be dispensed with. It is also an object of the invention to produce filter cakes which are capable of self-sustaining combustion. It is a further object of the invention to provide a dewatering process which gives a filter cake whose entire calorific content can, when the cake is combusted, in place of primary energy sources, in a power station, be converted to electricity and steam.

We have found that this object is achieved, according to the invention, if the sewage sludges are concentrated by adding an organic flocculant during thickening by gravity sedimentation from 0.5-5.0% by weight of sludge solids to 6-14, and especially 8-12%, by weight of sludge solids, the sewage sludges are mixed with additives, such as finely divided coal or ash or mixtures thereof, in an amount of from 0.5 to 1.5 parts by weight per part by weight of sludge solids, and the sludges are treated, before, during or after admixture of the additives, with a further 2-8 kg of organic flocculant/tonne of sludge solids and are then dewatered on the filter press.

In a particular embodiment of the invention, the sewage sludges are treated with additional amounts of organic flocculant before admixture of the additive, in particular by mixing the sludge with the flocculant solution in a stirred vessel for 1–3 minutes at a stirrer speed of 5–50 r.p.m. or by bringing the sewage sludges into contact with the flocculant solution in the space of less than 1 minute in static tube mixers which have spirals in their interior.

According to a further embodiment of the invention, the treatment of the sewage sludge with a further amount of organic flocculant can also be effected simultaneously with the admixture of the additives in a mixer in the course of 1–5 minutes at a stirrer speed of 5–50 r.p.m.

The organic flocculants used for the process according to the invention are flocculant mixtures which consist of a flocculant which is 30–40% cationically modified and a flocculant which is 70–90% cationically modified, these two flocculants being present in the ratio from 1:3 to 3:1, preferably 1:1.

For the purposes of the invention, sewage sludges include primary sludges which are obtained by sedimentation in the preliminary clarification stage of a sewage plant, mixed sludges which are a mixture of activated sludges (surplus sludges), from biological sewage plants, with primary sludges, digested sludges and mineralized sludges which are formed, for example, by extended aeration at ambient temperature. These sludges can be of municipal, industrial or mixed origin.

These sewage sludges arise with solids contents of 0.5–5.0%. The organic total solids in the sludge solids as a rule account for less than 70%. Such sewage sludges can be concentrated by organic flocculants to 6–14% and especially 8–12% by weight of solids by gravity sedimentation in the thickeners of a sewage plant. Accordingly, not only is sedimentation speeded up, but the degree of thickening is also substantially increased.

Commercial types of organic flocculants can be used. These are water-soluble, macromolecular compounds which are obtained by polymerization or copolymerization of acrylamide, acrylic acid and/or its salts, or acrylate or methacrylate esters which have been specially modified by a choice of their alcohol component. These flocculants can differ from one another in respect of their different electrical charge (ie. they may be cationic, anionic or electrically neutral) and in respect of their degree of polymerization.

A suitable type and amount of flocculant is chosen by conventional methods on the laboratory scale.

Anionic or cationic flocculants can be used for the thickening step. They are employed in amounts of from 0.5–2.0 kg of active ingredient/tonne of sludge solids.

The prior selection of the organic flocculant to be employed for extensive improvement of the dewatering characteristics of the sludge mixtures according to the invention is made in accordance with the methods described in German Laid-Open Application DOS No. 2,837,017.

In accordance with the object of the invention, the flocculation reaction should produce sludge floc having a particularly high mechanical stability.

We have found, surprisingly, that mixtures of organic flocculants which consist of one flocculant with 30–40% cationic modification and one flocculant with 70–90% cationic modification give sludge floc which is mechanically particularly stable. The two flocculants can be mixed in the ratio of from 1:3 to 3:1, but preferably of 1:1. The requisite amounts of flocculant are 2–8 kg of active ingredient/tonne of sludge solids. They depend on the nature of the particular sludge and on the solids concentration.

The flocculants are employed as 0.05–0.2% strength aqueous solutions. The dilute flocculant solutions are prepared from the solid and fluid commercial products by conventional methods in commercial equipment.

The flocculant solutions are fed directly into the sludge line downstream of the sludge pump. It can be advantageous to use such aids as, for example, a cone mixer, or a static mixer, of small cross-section, for introducing the solution.

In the process according to the invention, additives, such as finely divided coal and ash, are introduced into the thickened sewage sludges.

Suitable finely divided coals are coal fines which are obtained on separating the fines from waste rock by flotation and subsequent dewatering. Coal slurries resulting from wet dressing processes are also suitable. Further, sieve fractions of power-station coal or of green coke from refineries, the fractions having a particle size of up to 1 mm, can be used.

Ashes of various origins can also be used as additives. It is particularly economical to use ashes which result from the combustion of garbage or from the combustion of the sewage sludges themselves. The ashes should be substantially lime-free and should have a pH of from 6 to at most 8. An ash having a pH of above 8 has an adverse effect on the subsequent flocculation.

The amounts of the additives employed depend on the particular objective. If filter cakes capable of self-sustaining combustion are to be produced, the ratio of sludge solids:coal solids:ash is from 1:0.2:0.3 to 1:0.5:1.0.

If filter cakes suitable for use as a fuel for power stations are desired, ie. if the filter cakes are to have a particularly high calorific value, whilst the specific water content is to be very low, the addition of ash is dispensed with and only finely divided coal is added. Ratios of sludge solids:coal solids of from 1:1.2 to 1:1.5 have proved particularly advantageous.

The additives are homogeneously dispersed in the sewage sludge by means of mixers, which can be operated batchwise or continuously. The residence time in the mixers is from 1 to 5 minutes, and the stirrer speeds are from 5 to 50 r.p.m.

Because of the particularly high mechanical stability of the sludge floc achieved when using the flocculant mixtures according to the invention, the treatment of the sewage sludges with further amounts of organic flocculants can be carried out even before introducing the additives. We have found, surprisingly, that using this procedure the highest degree of dewatering of the sludge mixtures upon pressure filtration in the filter press is achieved.

The pretreatment of the thickened sewage sludges with the aqueous 0.05–0.2% strength flocculant solutions can be carried out in a stirred vessel through which the material flows upward (a dynamic flocculating reactor) in 1–3 minutes at stirrer speeds of 5–50 r.p.m. The floc ripening time and the most advantageous energy input can be determined by the method described in German Laid-Open Application DOS No. 2,920,434.

This pretreatment can be carried out equally successfully in static tube mixers which possess spirals in their interior. Using these, the floc ripening times are less than 1 minute, because of the special hydraulic conditions prevailing. As a rule, a plurality of mixer elements are arranged in series. This mixing zone (constituting a static flocculating reactor) forms a part of the sludge line.

In another embodiment, the treatment of the sewage sludges with additional amounts of organic flocculants can be effected simultaneously with the introduction of the additives in a mixer, in 1–5 minutes at stirrer speeds of 5–50 r.p.m. In this case, the mixer also serves as a flocculating reactor. The floc ripening time required for the flocculation, and the necessary energy input, can be achieved with this method. With some sludge mixtures, this type of pretreatment results in equally advantageous dewatering effects upon pressure filtration on a filter press as those achieved with the method described above.

The flocculated sludge mixtures which contain the additives are collected in an intermediate vessel, which serves as a buffer vessel, and are conveyed from there into the filter presses.

Suitable filter presses are chamber filter presses, plate-and-frame filter presses and membrane filter presses. If the additives are used in amounts of 0.5–1.5 parts by weight per part by weight of sludge solids, relatively thick layers of up to 40 mm can be pressed. This is an advantage of the process according to the invention, since it allows relatively thick layers to be pressed when using organic flocculants as dewatering assistants, whereas previously this required the use of iron salts and lime.

Pressing is carried out for 90–180 minutes under pressures of up to 15 bar. If the measures provided by the invention are employed, the press cakes satisfactorily release from the filter cloths, so that they can be ejected automatically.

The solids contents achieved in the press cakes are surprisingly high:

In the method in which finely divided coal is added to the sewage sludges in a ratio of sludge solids: coal solids of from 1:1.2 to 1:1.5, solids contents of the press cake of 55–65% are achievable. The specific water contents of the press cakes are of the order of 1.4–1.6 kg per kg of sludge solids. The calorific values are from 9,200 to 14,600 kJ/kg (2,200–3,500 kcal/kg). Because of the high calorific value and the low specific water contents, these press cakes can be used as power station fuel.

The particular advantages of this method are that, first, the finely divided coal which is initially used as a filter aid can be fully utilized as a primary energy source, and, secondly, the entire calorific content of the organic solids of the sewage sludges can be utilized to generate electricity and steam. This method is of particular importance for large municipal sewage plants, since municipal sewage sludges are particularly energy-rich and provide advantageous preconditions for combustion.

In the method in which finely divided coal and ash in ratios of sludge solids:coal solids:ash of from 1:0.2:0.3 to 1:0.5:1.0 are added to the sewage sludges, press cakes with solids contents of 50–60% can be obtained. The specific water contents of the press cakes are of the order of from 1.3 to 1.8 kg/kg of sludge solids. The calorific values are 4,600–6,300 kJ/kg (1,100–1,500 kcal/kg). These press cakes can be used for self-sustaining combustion in fluidized bed furnaces or multi-story furnaces.

This method allows cheap disposal of the sewage sludges with minimum energy consumption, in cases where combustion in a power station, so as to generate energy, is not possible.

The advantage of this embodiment of the process according to the invention over the prior art processes is that the more effective mechanical dewatering directly produces filter cakes which are capable of self-sustaining combustion. Accordingly, energy-intensive drying of the dewatered sewage sludges, or the addition of relatively large amounts of finely divided coal and/or fuel oil, are no longer necessary. Thus, the process according to the invention produces a useful primary energy carrier from the sewage sludges, or saves primary energy in disposal of the sludges. Where the sludges are combusted in fluidized bed furnaces, greater operating safety is achieved as a result of the absence of lime. Furthermore, because of the great reduction in volume, the capacity of the dewatering equipment and combustion equipment is better utilized.

The examples which follow illustrate the invention. Percentages are by weight.

In Examples 1–5, a mixed sludge from a mechanical-biological sewage plant was used; it consisted of 80 percent of activated sludge and 20 percent of primary sludge, with 65% organic matter in the sludge solids. The mixed sludge was concentrated in a rotary thickener by adding a 0.2% strength aqueous solution of a 40% anionically modified flocculant, in an amount of 1 kg of active ingredient-tonne of sludge solids. The solids content of the thickened mixed sludge was 9.5%.

EXAMPLE 1

Flocculation

A 0.2% strength aqueous solution of a flocculant mixture consisting of equal parts of a 40% cationically modified organic flocculant and a 90% cationically modified organic flocculant was dispersed in the mixed sludge referred to above, by means of a cone mixer fitted into the sludge line. The total amount of organic flocculants added was 6.6 kg of active ingredient/tonne of sludge solids.

The mixed sludge containing the flocculant mixture was then stirred for 2 minutes in a cylindrical vessel with vertical flow. The screw-type stirrer used ran at 20 r.p.m.

Conditioning

A 50% strength aqueous suspension of coal sludge and sewage sludge ash was then added to the flocculated sludge in a double-shaft mixer in the course of 4 minutes, at a stirrer speed of 20 r.p.m., the amount added corresponding to a ratio of sludge solids:coal solids:ash of 1:0.3:0.6. The calorific value of the solids in the coal sludge employed was 23,000 kJ/kg (5,500 kcal/kg). The total solids content of this sludge mixture was 12.6%.

Pressure filtration

The flocculated and conditioned sludge was introduced into a collecting vessel and conveyed from there, by means of diaphragm pumps, into a chamber filter press with a plate spacing of 33 mm. Pressure filtration was effected up to a final pressure of 15 bar. The press time was 150 minutes. The press cakes automatically detached from the filter cloths.

Data of the press cakes

| | |
|---|---|
| Solids content: | 58.5% |
| Specific water content: | 1.35 kg of water/kg of sludge solids |
| Calorific value $H_U$: | 5,605 kJ/kg (1,341 kcal/kg) |

The press cakes can be subjected to self-sustaining combustion in a fluidized bed furnace.

EXAMPLE 2

The procedure described in Example 1 was followed, except that the 0.2% strength aqueous flocculant solution was introduced simultaneously with admixture of the additives in the double-shaft mixer, under the same conditions as before.

After pressure filtration on a chamber filter press, the press cakes were easily ejectable.

Data of the press cakes

| | |
|---|---|
| Solids content: | 56.2% |
| Specific water content: | 1.47 kg of water/kg of sludge solids |
| Calorific value $H_U$: | 5,321 kJ/kg (1,173 kcal/kg) |

The press cakes were combustible in a fluidized bed furnace, without addition of fuel. This example shows that the object of the invention is achieved even by the simplified procedure.

EXAMPLE 3

Flocculation

A 0.1% strength aqueous solution of a flocculant mixture consisting of one part of a 40% cationically modified organic flocculant and 2 parts of a 90% cationically modified organic flocculant was dispersed in the mixed sludge by means of a cone mixer. The total amount of organic flocculants added was 5.8 kg of active ingredient/tonne of sludge solids. The sludge containing the flocculant mixture then flowed through a mixing zone consisting of a series of static tube mixers (from Kenics). The residence time in this mixing zone was 30 seconds.

Conditioning

Finely divided coal was then added to the flocculated sludge in a double-shaft mixer in the course of 3 minutes, at a stirrer speed of 25 r.p.m. The ratio of sludge solids to coal solids was 1:1.3. The finely divided coal used was a flotation concentrate which had a calorific value of 31,000 kJ/kg (7,400 kcal/kg).

The total solids content of this sludge mixture was 13%.

Pressure filtration

Pressure filtration was carried out as described in Example 1. The press time was 150 minutes. The press cakes were dry and detached satisfactorily from the filter cloths.

Data of the press cakes

| Solids content: | 61.8% |
| --- | --- |
| Specific water content: | 1.42 kg of water/kg of sludge solids |
| Calorific value $H_U$: | 13,800 kJ/kg (3,300 kcal/kg) |

The calorific value was of the same order as that of a good-quality lignite ($H_U$: 2,500–3,500 kcal/kg). The press cakes were combustible in a power station boiler, in order to generate secondary energy (electricity and steam).

EXAMPLE 4

The procedure described in Example 3 was followed, but the 0.1% strength aqueous flocculant solution was added simultaneously with admixture of the finely divided coal in the double-shaft mixer, under otherwise identical conditions.

After pressure filtration on a chamber filter press, it was possible to eject the press cakes automatically.

Data of the press cakes

| Solids content: | 59.2% |
| --- | --- |
| Specific water content: | 1.58 kg of water/kg of sludge solids |
| Calorific value $H_U$: | 13,108 kJ/kg (3,136 kcal/kg) |

These press cakes, again, were combustible in a power station.

EXAMPLE 5

Flocculation

A 0.1% strength aqueous solution of a flocculant mixture, which consisted of equal parts of an organic 30% cationically modified flocculant and an organic 90% cationically modified flocculant was dispersed in the mixed sludge by means of a cone mixer. The total amount of organic flocculants added was 5.5 kg of active ingredients/tonne of sludge solids. The sludge containing the flocculant mixture was then treated, with stirring, in a cylindrical vessel with vertical flow. The screw stirrer ran at 15 r.p.m.

Conditioning

A 50% strength aqueous suspension of coal sludge, as used in Example 1, was added to the flocculated sludge in the course of 3 minutes in a double-shaft mixer, at a stirrer speed of 25 r.p.m. The amount added was chosen to give a ratio of sludge solids:coal solids of 1:1.4.

The total solids content of the sludge mixture was 13.0%.

Pressure filtration

Pressure filtration was carried out as described in Example 1. The press time was 160 minutes. It was possible to eject the press cakes automatically.

Data of the press cakes

| Solids content: | 60.4% |
| --- | --- |
| Specific water content: | 1.57 kg of water/kg of sludge solids |
| Calorific value $H_U$: | 10,809 kJ/kg (2,586 kcal/kg) |

To establish the most advantageous point of addition of the organic flocculant when carrying out the dewatering according to the invention as a laboratory experiment, a mixed sludge which in origin, composition and thickening conditions corresponded to the mixed sludge used in Examples 1 to 5 was employed on five successive days. The solids content of the thickened mixed sludge samples was 8.9–9.2% and the organic content in the sludge solids was 64.2–65.8%.

The sludge pretreatment was carried out by 3 methods in each case:

Method A 500 ml of mixed sludge are introduced into a tall 1 liter beaker. A 0.2% strength aqueous flocculant solution is then added in the course of 10 seconds whilst stirring at 50 r.p.m. by means of a blade stirrer. The flocculated sludge is then treated for a further 120 seconds at the stated stirrer speed.

The stirrer speed is then increased to 200 r.p.m. and the relevant additives (finely divided coal, ash) are added in the stated amounts in the course of 30 seconds. The total mixing time is 3 minutes.

Method B 500 ml of mixed sludge are introduced into a 1 liter beaker. The additives and the flocculant solution are then added successively in the course of 30 seconds, whilst stirring at a speed of 200 r.p.m. The total mixing time is 3 minutes.

Method C 500 ml of mixed sludge are introduced into a 1 liter beaker. The additives are added successively in the course of 30 seconds, whilst stirring the mixture at 200 r.p.m. The total mixing time is 3 minutes.

The stirrer speed is then dropped to 50 r.p.m. and the flocculant solution is added in the course of 10 seconds. The flocculated sludge mixture is thereafter treated for a further 120 seconds at the stated stirrer speed.

The reason for increasing the stirrer speeds, when admixing the additives, compared to the practical experiments in Examples 1 to 5, is to achieve a comparable energy input.

The sludge samples pretreated by Methods A, B and C were immediately subjected to pressure filtration on a laboratory press. They were dewatered for 1 minute under increasing pressure, and then for 2 minutes under a constant pressure of 10 bar.

COMPARATIVE EXAMPLE 1

In these experiments, finely divided coal (a coal sludge in the form of a 50% strength aqueous suspension) and sewage sludge ash were added to the mixed sludge samples. The ratio of sludge solids:coal solids:ash was 1:0.3:0.6 in each case.

The flocculant solution used was a 0.2% strength aqueous solution of a mixture of equal parts of an organic 40% cationically modified flocculant and an organic 90% cationically modified flocculant. The total amount of organic flocculant added was 6.5 g of active ingredient/kg of sludge solids.

The following degrees of dewatering (solids contents of the press cakes) were found after pressure filtration:

|  | Mean value (x) | Standard deviation (s) |
|---|---|---|
| Method A | 55.8% | 0.5 |
| Method B | 55.0% | 1.6 |
| Method C | 52.8% | 2.9 |

COMPARATIVE EXAMPLE 2

In this series of experiments, a flotation concentrate was added to the mixed sludge. The ratio of sludge solids to coal solids was 1:1.3.

The flocculant solution used was a 0.2% strength aqueous solution of a flocculant mixture which consists of one part of an organic 40% cationically modified flocculant and 2 parts of an organic 90% cationically modified flocculant. The total amount of organic flocculants added was 5.8 g of active ingredient/kg of sludge solids.

After pressure filtration, the following solids contents of the press cakes were found:

|  | Mean value (x) | Standard deviation (s) |
|---|---|---|
| Method A | 58.1% | 1.1 |
| Method B | 57.5% | 2.5 |
| Method C | 56.2% | 2.8 |

Comparative Examples 1 and 2 show that with addition, according to the invention, of the flocculants before or during admixture of the additives, the most advantageous dewatering effects, with the smallest range of fluctuation, are achieved.

EXAMPLES 6 AND 7

(Use of green coke and of power station coal)

The mixed sludge used was the same as that employed in Comparative Examples 1 and 2. The solids content of the thickened sludge was 8.9% and the organic content of the sludge solids was 65.3%.

The sludge pretreatment with the organic flocculants and the additives was carried out according to Method A. The pressure filtration was carried out as described in Comparative Experiments 1 and 2.

The flocculant solution employed was a 0.2% strength aqueous solution of a flocculant mixture consisting of equal parts of an organic 40% cationically modified flocculant and an organic 90% cationically modified flocculant. The total amount of organic flocculants added was 6.0 g of active ingredient/kg of sludge solids.

The additives used were sieve fractions, of particle size less than 1 mm, either of green coke from a refinery (Example 6) or of power station coal (Example 7). The ratio of sludge solids to coal solids was 1:1.3.

The calorific values of the solids in these materials were as follows:

| Green coke: | $H_U$: 35,100 kJ/kg (8,400 kcal/kg) |
|---|---|
| Power station coal: | $H_U$: 29,700 kJ/kg (7,100 kcal/kg) |

Data of the press cakes

|  | Example 6 (green coke) | Example 7 (power station coal) |
|---|---|---|
| Solids content (%): | 59.6 | 58.8 |
| Specific water content kg of water/kg of sludge solids) | 1.56 | 1.61 |
| Calorific value $H_U$ (kJ/kg.) | 14,638 | 12,590 |
| (kcal/kg) | 3,502 | 3,012 |

Examples 6 and 7 show that green coke and power station coal can be employed in the same way as finely divided coal in the process according to the invention.

COMPARATIVE EXAMPLE 3

In carrying out Example 1, the flocculated and conditioned sludge being conveyed from a collecting vessel into a chamber filter press by means of a diaphragm pump, a sample of this sludge was taken upstream of the pump and another sample downstream of the pump. The samples were taken when the press pressure had reached 15 bar.

The samples were then subjected to pressure filtration on a laboratory press. They were dewatered for 1 minute under increasing pressure and for 2 minutes under a constant pressure of 10 bar.

For comparison, a flocculant mixture not according to the invention was employed, consisting of one part of an organic 70% cationically modified flocculant and 2 parts of an organic 90% cationically modified flocculant. In other respects, the procedure described in Example 1 was followed.

Sampling and testing on the laboratory press were carried out under comparable conditions to those stated above.

Solids content of the press cakes (laboratory press)

| Sampling position: | Upstream of pump | Downstream of pump |
|---|---|---|
| Example 1 (using a flocculant mixture aooording to the invention) | 54.8% | 54.1% |
| Comparative Example 3 (using a flocculant mixture not according to the invention) | 53.2% | 43.8% |

This comparative example shows the great ability of the sludge floc, obtained on using the flocculant mixture according to the invention and the procedure according to the invention, to withstand mechanical stress.

We claim:

1. A process for producing combustible filter cakes from sewage sludges of which the sewage sludge solids contain less than 70% by weight of organic matter which comprises: concentrating the sewage sludges in the absence of lime by gravity sedimentation by adding a synthetic organic flocculant in amounts of from 0.5-2.0 kg/metric ton of sewage sludge solids from 0.5-5.0% by weight of sewage sludge solids to 6-14% by weight of sewage sludge solids; mixing the sewage sludges with finely divided coal or ash or mixtures thereof, in an amount of from 0.5 to 1.5 parts by weight per part by weight of sewage sludge solids;

treating the sewage sludges by mixing before, during or after adding finely divided coal or ash or mixtures thereof with a further amount of organic flocculants 2-8 kg/metric ton of sewage sludge solids to form flocs having high mechanical stability wherein said organic flocculants employed are mixtures, in a weight ratio of from 1:3 to 3:1 of a flocculant which is 30 to 40% by weight cationically modified and a flocculant which is 70–90% by weight cationically modified;

and thereafter dewatering the sewage sludges in a filter press to form sewage sludge - filter cakes which release satisfactorily for automatic ejection, have solids contents of 50–65% by weight, and which can be burnt without the addition of auxiliary fuel.

2. The process of claim 1, wherein the treatment of the sewage sludge with the said mixture of organic flocculants is effected before adding finely divided coal or ash or mixtures thereof, namely by mixing the sewage sludge with a solution of the flocculants in water having a concentration of from 0.05–0.2% by weight in a stirred vessel in the course of from 1 to 3 minutes at stirrer speeds of from 5 to 50 r.p.m.

3. The process of claim 1, wherein the treatment of the sewage sludge with the said mixture of organic flocculants is effected before adding finely divided coal or ash or mixtures thereof, namely by bringing the sewage sludge into contact with the said flocculant solution in the course of less than 1 minute in static tube mixers which possess spirals in their interior.

4. The process of claim 1, wherein the treatment of the sewage sludge with the said mixture of organic flocculants is effected simultaneously with adding finely divided coal or ash or mixtures thereof, namely by mixing the sewage sludge with the said flocculant solution and the finely divided coal or ash or mixtures thereof in a stirred vessel in the course of from 1 to 5 minutes at stirrer speeds of from 5 to 50 r.p.m.

5. The process of claim 1, wherein the coal mixed with the sewage sludge consists of coal solids, having a particle size of 1 mm or less, in a weight ratio of sewage sludge solids; coal solids of from 1:1.2 to 1:1.5; whereby filter cakes having a water content of 1.4–1.6 kg of water per kg of sewage sludge solids and calorific values of 2,200–3,500 kcal/kg are produced which are usable alone as a power station fuel.

6. The process of claim 1, wherein the sewage sludge solids are concentrated to 8–12% by weight of sewage sludge solids.

* * * * *